United States Patent [19]
Little

[11] Patent Number: 5,903,767
[45] Date of Patent: *May 11, 1999

[54] INTEGRATED CIRCUIT FOR PROVIDING SUPERVISORY FUNCTIONS TO A MICROPROCESSOR

[75] Inventor: Wendell L. Little, Carrollton, Tex.

[73] Assignee: Dallas Semiconductor Corporation, Dallas, Tex.

[*] Notice: This patent is subject to a terminal disclaimer.

[21] Appl. No.: 08/834,880

[22] Filed: Apr. 7, 1997

Related U.S. Application Data

[63] Continuation of application No. 07/283,267, Dec. 9, 1988, Pat. No. 5,754,462.

[51] Int. Cl.⁶ ........................................... G06F 13/00
[52] U.S. Cl. .................................................. 395/750.05
[58] Field of Search ..................... 395/750.1–750.08; 364/707

[56] References Cited

U.S. PATENT DOCUMENTS

| | | | |
|---|---|---|---|
| 4,317,181 | 2/1982 | Teza et al. | 364/707 |
| 4,404,972 | 9/1983 | Gordon et al. | 128/419 |
| 4,409,665 | 10/1983 | Tubbs | 364/707 |
| 4,461,003 | 7/1984 | Tamaki | 395/182.2 |
| 4,568,179 | 2/1986 | Sirazi et al. | 371/12 |
| 4,586,157 | 4/1986 | Rector et al. | 711/115 |
| 4,591,782 | 5/1986 | Germer | 324/103 |
| 4,615,005 | 9/1986 | Maejima et al. | 364/200 |
| 4,627,022 | 12/1986 | Mensink et al. | 364/900 |
| 4,658,352 | 4/1987 | Nagasawa | 364/200 |
| 4,698,748 | 10/1987 | Juzswick et al. | 395/750.04 |
| 4,742,482 | 5/1988 | Inskeep et al. | 364/900 |
| 4,766,567 | 8/1988 | Kato | 364/700 |
| 4,768,147 | 8/1988 | Lamiaux | 395/750.07 |
| 4,777,626 | 10/1988 | Matsushita et al. | 371/66 |
| 4,794,589 | 12/1988 | Finch | 370/419 |
| 4,809,280 | 2/1989 | Shonaka | 395/185.08 |
| 4,851,987 | 7/1989 | Day | 364/560 |
| 4,868,832 | 9/1989 | Marrington et al. | 395/750.07 |
| 5,175,845 | 12/1992 | Little | 395/750.05 |

FOREIGN PATENT DOCUMENTS

| | | |
|---|---|---|
| 0077845 | 10/1981 | European Pat. Off. . |
| 55-66763 | 5/1980 | Japan . |

OTHER PUBLICATIONS

Allen, "Analog supervisor chip keeps microprocessor out of trouble." 35 *Elecrtron. Des.* No. 10, pp. 104–108 (Apr. 30, 1987).

Primary Examiner—Ayaz R. Sheikh
Assistant Examiner—Paul R. Myers
Attorney, Agent, or Firm—Jenkens & Gilchrist

[57] ABSTRACT

A system which includes a microprocessor (or microcontroller) and an auxiliary chip which monitors the system power supply voltage and performs related functions for the microprocessor. Another of the innovative teachings set forth in the present application is that the microprocessor can access the auxiliary chip to ascertain the power history. That is, the microprocessor can direct an interrupt to the auxiliary chip, which will cause the auxiliary chip to respond with a signal which indicates to the microprocessor whether the power supply voltage is heading up or down. When the microprocessor is reset at power-up, and detects that the power supply voltage is still marginal, the present invention permits the microprocessor to determine (by querying the auxiliary chip) whether the supply voltage is marginal so that the microprocessor does not go into full operation until the supply voltage is high enough.

9 Claims, 9 Drawing Sheets

FIG. 1
POWER MONITOR, WATCHDOG TIMER, AND PUSHBUTTON RESET

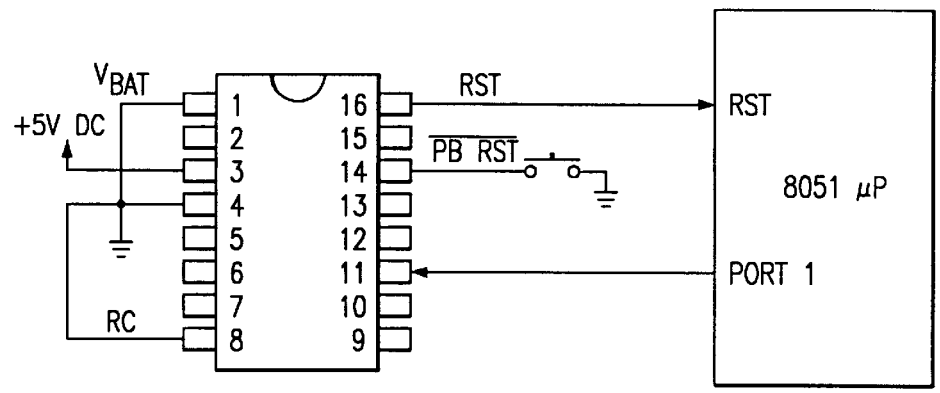

FIG. 2
NONMASKABLE INTERRUPT

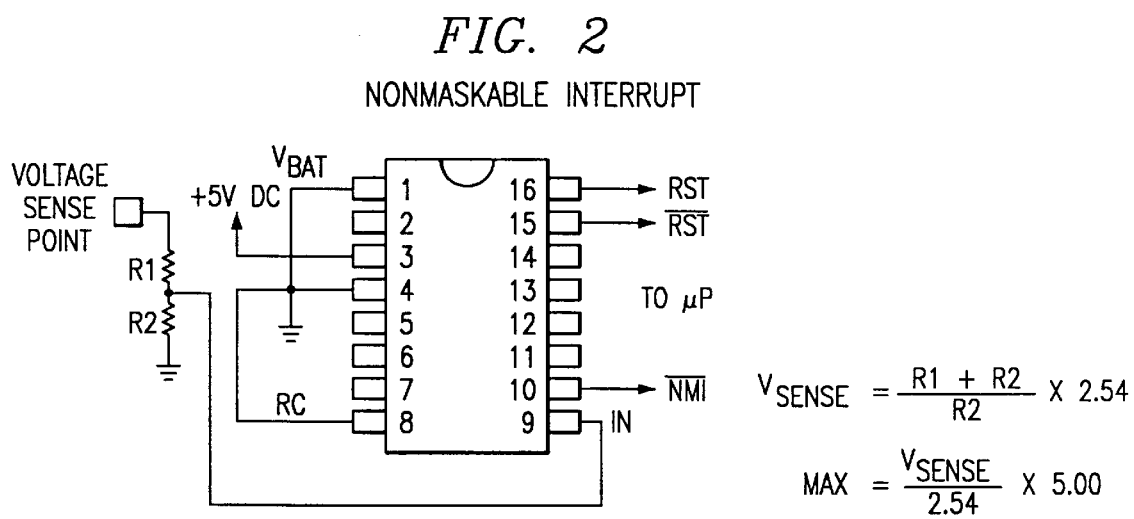

$$V_{SENSE} = \frac{R1 + R2}{R2} \times 2.54$$

$$MAX = \frac{V_{SENSE}}{2.54} \times 5.00$$

EXAMPLE 1: 5 VOLT SUPPLY, R2 = 10k OHM, $V_{SENSE}$ = 4.80 VOLTS $$\therefore 4.80 = \frac{R1 + 10K}{10k} \times 2.54 \qquad R1 \cong 8.9K \text{ OHM}$$

EXAMPLE 2: 12 VOLT SUPPLY, R2 = 10K OHM, $V_{SENSE}$ = 9.00 VOLTS $$\therefore 9.00 = \frac{R1 + 10K}{10k} \times 2.54 \qquad R1 \cong 25.4K \text{ OHM}$$

$$V_{MAX} = \frac{9.00}{2.54} \times 5.00 = 17.7 \text{ VOLTS}$$

NONVOLATILE SRAM

FRESHNESS SEAL

NOTE: THIS SERIES OF PULSES MUST BE APPLIED DURING NORMAL 5 VOLT OPERATION.

POWER SWITCHING

POWER UP: RESET CONTROL = $V_{CCO}$

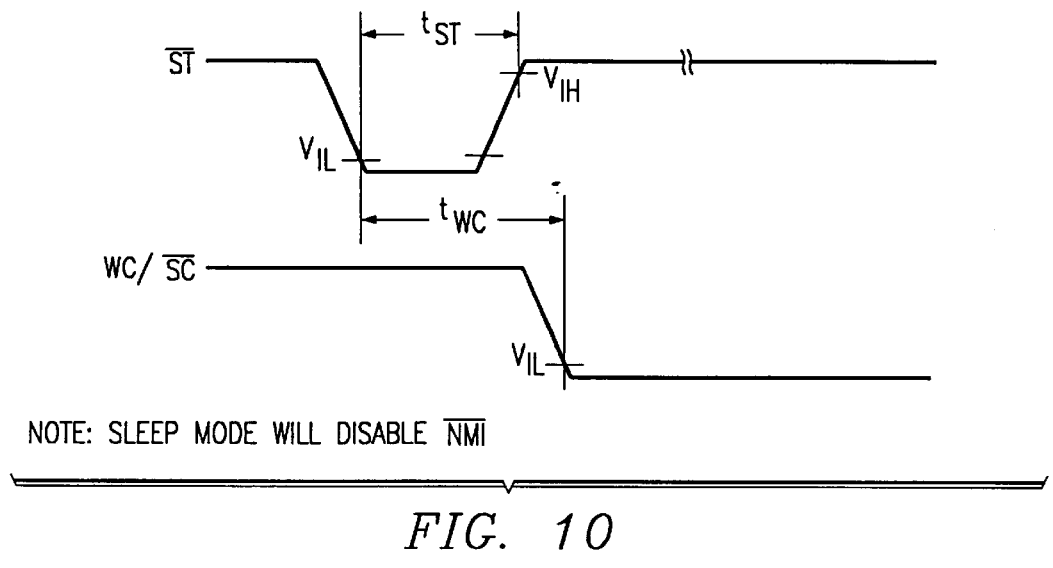
FIG. 10
WAKE/SLEEP CONTROL
FIG. 11
INVOKE WAKE POSSIBILITIES
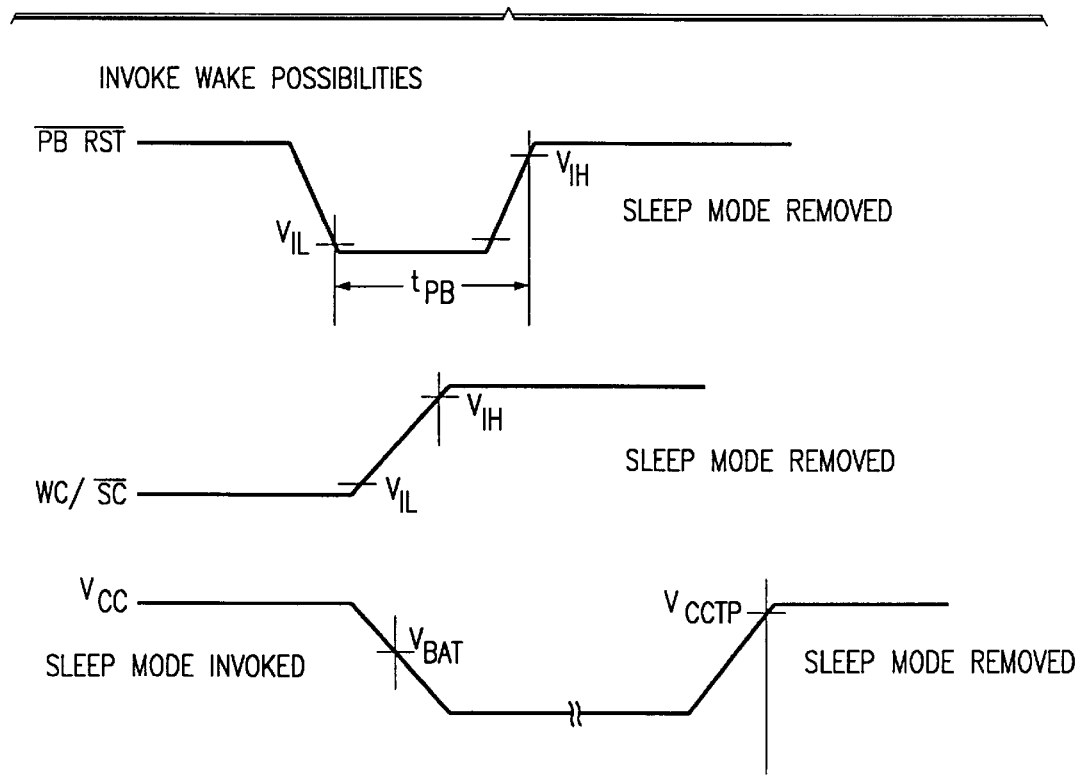

$\overline{NMI}$ FROM $\overline{ST}$

INTEGRATED CIRCUIT FOR PROVIDING SUPERVISORY FUNCTIONS TO A MICROPROCESSOR

This application is a Continuation of application Ser. No. 07/283,267, filed on Dec. 9, 1988, now U.S. Pat. No. 5,754,462.

CROSS-REFERENCE TO OTHER APPLICATIONS

The following applications of common assignee contain related subject matter, and are believed to have effective filing dates identical with that of the present application:

Ser. No. 07/283,268, filed Dec. 9, 1988, entitled "POWER-UP RESET CONDITIONED ON DIRECTION OF VOLTAGE CHANGE" (2846-128);

Ser. No. 07/282,793, filed Dec. 9, 1988, entitled "SLEEP COMMAND CONDITIONED BY TIMING WINDOW DERIVED FROM STROBE PIN" (2846-129);

all of which are hereby incorporated by reference.

PARTIAL WAIVER OF COPYRIGHT

All of the material in this patent application is subject to copyright protection under the copyright laws of the United States and of other countries. As of the first effective filing date of the present application, this material is protected as unpublished material However, permission to copy this material is hereby granted to the extent that the copyright owner has no objection to the facsimile reproduction by anyone of the patent document or patent disclosure, as it appears in the United States Patent and Trademark Office patent file or records, but otherwise reserves all copyright rights whatsoever.

BACKGROUND AND SUMMARY OF THE INVENTION

The present invention relates to low-power systems and subsystems employing microprocessors, and to integrated circuit elements which help to manage the low-level operation of a microprocessor.

The very rapid progress of integrated circuit complexity generally, and the general use of CMOS processing, have permitted a huge increase in the functionality which can be included in a very compact portable system. The availability of low-power LCD displays has further speeded the advance of such systems. However, power supply capabilities have not advanced as rapidly. Battery technology has provided a relatively slow increase in the amount of energy which can be stored per unit weight (or per unit volume). Thus, in order to provide complex functionality in a small portable module, a very high degree of power efficiency has become an enabling technology.

A separate line of technological progress is the increasing use of batteries, in integrated circuit packages or in very small modules, to provide nonvolatile data retention. Here the driving concern is not the system power budget, but reliability and robustness. The availability of battery backup can be used to ensure that power outages or power-line noise cannot cause loss of data (including configuration data). For example, modern semiconductor technology has provided solid-state memories with such low standby power requirements that a single coin-sized battery can power the memory for ten years of lifetime or more. Such memories are already commercially available.

Low-power microcontrollers have also been commercially available in recent years. An unusual example of such a microcontroller is the DS5000 Soft MicroController™. (This integrated circuit and its data sheet are available from Dallas Semiconductor Corporation, 4350 Beltwood Parkway, Dallas Tex. 75244, and are both hereby incorporated by reference.) The DS5000 is a microcontroller which has a small battery packaged with it, to provide nonvolatility. Microprocessors and microcontrollers of this kind are extremely useful, since the internal memory of the microprocessor is always preserved. Therefore, the microprocessor can be programmed to "learn" while in service, or to internally store a parameter set which is adjustable throughout the lifetime of the microprocessor. However, aside from their nonvolatility, such microprocessors are typically not the highest-performing microprocessors. Thus, a user who needs nonvolatility may need to make some difficult choices.

The present invention provides an auxiliary integrated circuit, which can interface with a microprocessor (or other complex random logic chip) in a way which improves the microprocessor's power management during power-up and power-down transitions.

In the presently preferred embodiment, this auxiliary chip provides all necessary functions for power supply monitoring, reset control and memory back-up in microprocessor based systems. A precise internal voltage reference and comparator circuit monitor power supply status. When an out-of-tolerance condition occurs, the microprocessor reset and power fail outputs are forced active, and static RAM control unconditionally write protects external memory. The auxiliary chip also provides early warning detection by driving a non-maskable interrupt at a user defined voltage threshold. External reset control is provided by a pushbutton reset input which is debounced and activates reset outputs. An internal timer also forces the reset outputs to the active state if the strobe input is not driven low prior to time out. Reset control and wake-up/sleep control inputs also provide necessary signals for orderly shut down and start up in battery backup and battery operate applications.

The auxiliary chip provided by the present invention can be used with a very wide variety of different microcontrollers and microprocessors. Two significantly different types must be distinguished:

For low-power battery-backed CMOS microcontrollers and microprocessors (such as the DS5000), the microprocessor should not be reset when power is ailing (because such a reset will wake up the microprocessor, and cause it to draw power).

For NMOS microprocessors, and for CMOS microprocessors or microcontrollers which do not have access to a backup power supply, it is desirable to reset the processor as soon as possible when the power supply is failing, and keep it in reset until the power supply begins to recover. (Bringing the microprocessor under control early helps minimize power consumption, and helps to avoid random outputs from the microprocessor.)

A battery-backed microprocessor should preferably go into its "stop" mode when power goes down. However, the microprocessor alone does not normally know when it has been switched over to battery backup.

Another of the innovative teachings set forth in the present application is that the microprocessor can access the auxiliary chip to ascertain the power history. That is, the microprocessor can direct an interrupt to the auxiliary chip, which will cause the auxiliary chip to respond with a signal which indicates to the microprocessor whether the power supply voltage is heading up or down. When the microprocessor is reset at power-up, and detects that the power supply voltage is still marginal the present invention permits the microprocessor to determine (by querying the auxiliary chip) whether the supply voltage is marginal, so that the microprocessor does not go into full operation until the supply voltage is high enough This auxiliary chip, and systems or subsystems which use this auxiliary chip, provide at least the following advantages:

Holds microprocessor in check during power transients;

Halts and restarts an out-of-control microprocessor;

Monitors pushbutton for external override;

Warns microprocessor of an impending power failure;

Converts CMOS SRAM into nonvolatile memory,

Unconditionally write protects memory when power supply is out of tolerance;

Consumes less than 100 nA of battery current;

Can control an external power switch for high current applications;

Provides orderly shutdown in nonvolatile microprocessor applications;

Supplies necessary control for low power "stop mode" in battery operate hand held applications.

A further advantage of this auxiliary chip is that it provides designers with a greatly increased range of options. This auxiliary chip permits system designers to obtain many of the advantages of a specialized low-power microprocessor (such as the DS5000), while using a different microprocessor which has higher-speed, or more versatility, or compatibility with some existing software base, or special adaptation for some special purpose.

Thus, systems which include the combination of an auxiliary chip as described with a general-purpose microprocessor can have advantages including robustness in the face of power-supply crashes or glitches, and program resumption which appears (to the user) to be continuous with the program's operation at the moment when the machine was turned off (depending on how state-save operations are interwoven with software execution).

Normally, when it is desired to put a microprocessor into a known state, this is done by activating a reset. Some microprocessor architectures have reset lines running to every gate on the chip, so that a reset command will instantly reset every logical element to the known state. However, some architectures do not. For example, in the Intel 8051 architecture, several cycles are necessary after the reset command, to clock all of the logical elements on the chip into the known state. (This architecture is used not only in Intel's 80C51 microprocessor, but also in any other microprocessor which is to be compatible with this widely-used architecture.) For example, a simple example of a logic block which would require multiple cycles to reset would be a shift register, with a reset only at the input of the shift register. In this (hypothetical) case, it can be seen that, even after the reset command has provided a known state in the first stage of the shift register, unknown data may still exist in the following stages. Therefore, a series of clock commands must be provided, to propagate the known state all the way through the shift register.

Alternatively, if it is necessary to save the state of a microprocessor entering power-down, this can be done separately. For example, a "shadow" memory or register can be used to track the status of various on-chip registers, etc.

Similarly, if desired, portions of on-chip memory can even be used as "shadow" scratch pad, to preserve some state information during such power-down operations.

BRIEF DESCRIPTION OF THE DRAWING

The present invention will be described with reference to the accompanying drawings, which show important sample embodiments of the invention and which are incorporated in the specification hereof by reference, wherein:

FIG. 1 shows a typical example of the power monitor, watchdog timer, and pushbutton reset.

FIG. 2 shows how the high impedance input at the IN pin allows for a user to define a sense point, using a simple resistor voltage divider network to interface with high voltage signals.

FIG. 10 shows the signal timing relations which permit sleep mode to be entered, and FIG. 11 shows the signal timing relations which permit the chip to awaken from sleep mode.

DESCRIPTION OF THE PREFERRED EMBODIMENTS

The numerous innovative teachings of the present application will be described with particular reference to the presently preferred embodiment. However, it should be understood that this embodiment is only one example of the many advantageous uses of the innovative teachings herein. In general statements made in the specification of the present application do not necessarily delimit any of the various claimed inventions. Moreover, some statements may apply to some inventive features but not to others.

In the following description, the following pin and signal names may be referred to:

| | |
|---|---|
| $V_{BAT}$ | +3 Volt Battery Input |
| $V_{CCO}$ | Switched SRAM Supply Output |
| $V_{CC}$ | +5 Volt Power Supply Input |
| GND | Ground |

-continued

| | |
|---|---|
| PF | Power Fail (Active High) |
| PF* | Power Fail (Active Low) |
| WC/SC* | Wake Up Control (Sleep) |
| RC | Reset Control |
| IN | Early Warning Input |
| NMI* | Non Maskable Interrupt |
| ST* | Strobe Input |
| CEO* | Chip Enable Output |
| CEI* | Chip Enable Input |
| PBRST* | Push Button Reset Input |
| RST* | Reset Output (Active Low) |
| RST | Reset Output (Active High) |

Figure 6:
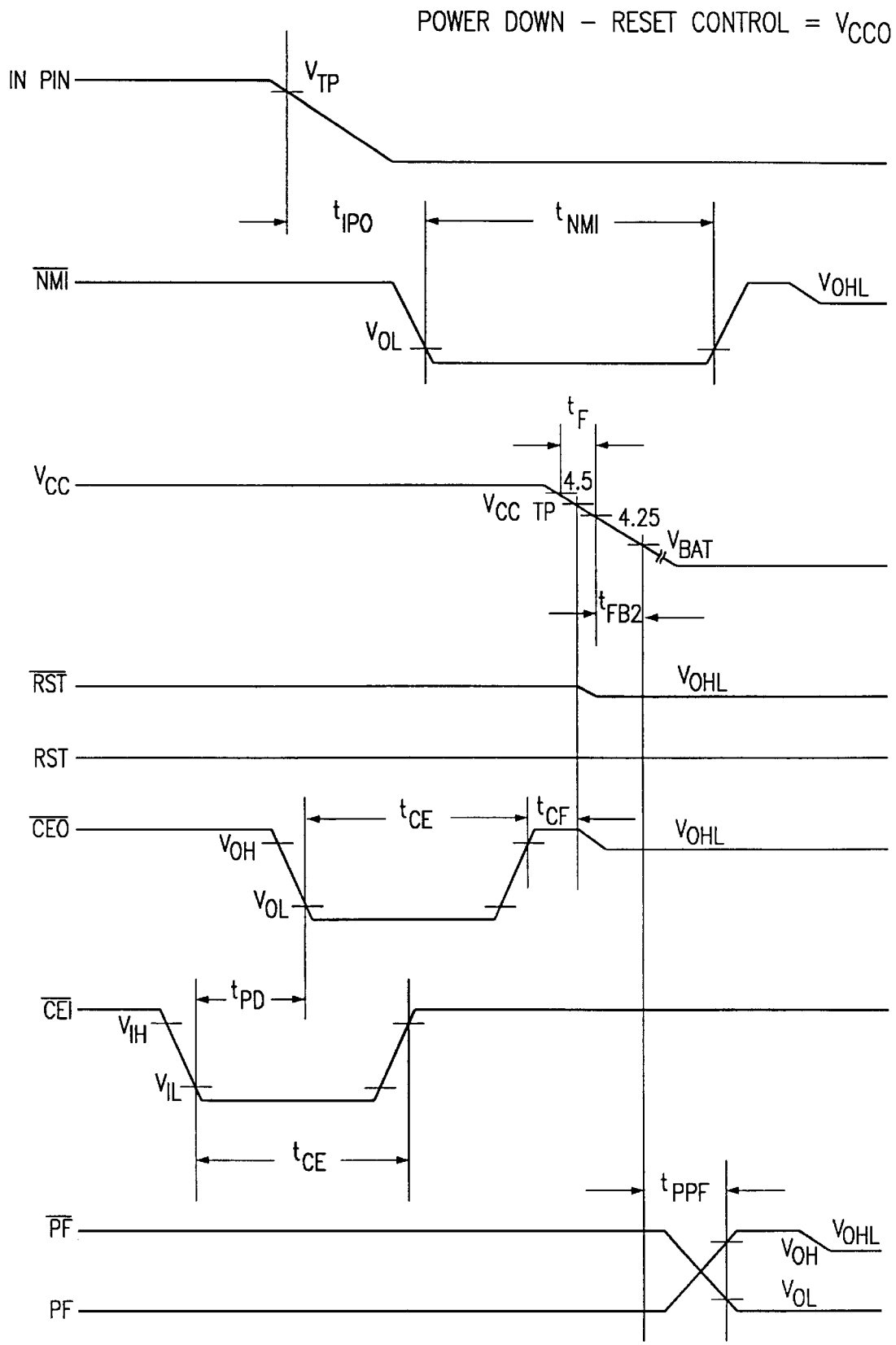
FIG. 6 shows the power-down timing relations which result, in the presently preferred embodiment, when the reset control input (RC) has been tied to $V_{CCO}$.

POWER MONITOR: The auxiliary chip employs a bandgap voltage reference and a precision comparator to monitor the 5 volt supply ($V_{CC}$) in microprocessor based systems. When an out-of-tolerance condition occurs, the RST and RST* outputs are driven to the active state. The $V_{CC}$ trip point ($V_{CCTP}$) is set, for 10% operation, so that the RST and RST* outputs will become active as $V_{CC}$ falls below 4.5 volts (4.37 typical). The $V_{CCTP}$ for the 5% operation option is set for 4.75 volts (4.62 typical). The RST and RST* signals are excellent for microprocessor control, as processing is stopped at the last possible moment of within-tolerance $V_{CC}$. On power up, the RST and RST* signals are held active for a minimum of 40 ms (60 ms typical) after $V_{CCTP}$ is reached to allow the power supply and microprocessor to stabilize. The mode of operation just described (and shown in FIGS. 7 and 8) is achieved if the reset control pin (RC) is connected to GND. Alternatively, by connecting the reset control pin RC to voltage $V_{CCO}$, a different mode of operation can be achieved. This different mode is shown in FIGS. 6 and 9, and is described below.

WATCHDOG TIMER: The auxiliary chip also provides a watchdog timer function by forcing the RST and RST* signals to the active state when the strobe input (ST*) is not stimulated for a predetermined time period. This time period is set for 220 ms typically with a maximum time-out of 300 ms. The watchdog timer begins timing out from the set time period as soon as RST and RST* are inactive. If a high-to-low transition occurs at the ST* input prior to time-out, the watchdog timer is reset and begins to time out again. To guarantee that the watchdog timer does not time-out, a high-to-low transition must occur at or less than 150 ms from watchdog timer reset. If the watchdog timer is allowed to time out, the RST and RST* outputs are driven to the active state for 40 ms minimum. The ST* input can be derived from microprocessor address, data, and/or control signals. Under normal operating conditions, these signals would routinely reset the watchdog timer prior to time out. If the watchdog timer is not required, it may be disabled by permanently grounding the IN input pin which also disables the NMI* output (described below). If the NMI* signal is required, the watchdog may also be disabled by leaving the ST* input open. The watchdog timer is also disabled as soon as the IN input falls to $V_{TP}$ or, if IN is not used and grounded, as soon as $V_{CC}$ falls to $V_{CCTP}$. The watchdog will then become active as $V_{CC}$ rises above $V_{CCTP}$ and the IN pin rises above $V_{TP}$.

PUSH-BUTTON RESET: An input pin is provided on the auxiliary chip for direct connection to a push-button. The push-button reset input requires an active low signal. Internally, this input is debounced and timed such that the RST and RST* outputs are driven to the active state for 40 ms minimum. This 40 ms delay begins as the pushbutton is released from low level. A typical example of the power monitor, watchdog timer, and pushbutton reset is shown in FIG. 2.

NONMASKABLE INTERRUPT: The auxiliary chip generates a non-maskable interrupt NM* for early warning of power failure to a microprocessor.

A precision comparator 110 monitors the voltage level at the input pin IN relative to a reference generated by the internal bandgap. The IN pin is a high impedance input allowing for a user defined sense point using a simple resistor voltage divider network (FIG. 3) to interface with high voltage signals. This sense point may be derived from the regulated 5 volt supply, or from a higher DC voltage level closer to the AC power input. Since the IN trip point $V_{TP}$ is 2.54 volts, the proper values for $R_1$ and $R_2$ can easily be determined. Proper operation of the auxiliary chip requires that the voltage at the IN pin be limited to 5 volts maximum. Therefore, the maximum allowable voltage at the supply being monitored (V.) can also be derived as shown. A simple approach to solving this equation is to select a value for $R_2$ of high enough impedance to keep power consumption low, and solve for $R_1$. The flexibility of the IN input pin allows for detection of power loss at the earliest point in a power supply system, maximizing the amount of time for microprocessor shut-down between NMI* and RST or RST*. When the supply being monitored decays to the voltage sense point, the auxiliary chip drives the NMI* output to the active state for a minimum of 200 microseconds, but does not hold it active. If the pin is connected to $V_{CC}$, the NMI* output will pulse low as $V_{CC}$ decays to $V_{CCTP}$ if RC pin at ground (see reset control section). NMI* will not pulse low if the RC pin is connected to $V_{CCO}$. The NMI* power fail detection circuitry also has built in time domain hysteresis. That is, the monitored supply is sampled periodically at a rate determined by an internal ring oscillator running at approximately 47 kHz (20 ms/cycle). Three consecutive samplings of out-of tolerance supply (below $V_{SENSE}$) must occur at the IN pin to active NM. Therefore, the supply must be below the voltage sense point for approximately 60 ms or the comparator will reset.

The NMI* signal has been defined, in the presently preferred embodiment, as a pulse, rather than a level because a constant output would keep some microprocessors from going into their lowest-power mode. Thus, the microprocessor cannot simply scan the NM* signal to see where the power supply voltage level is.

However, the microprocessor can query the auxiliary chip to see where the power supply level is. Whenever the auxiliary chip receives a pulse from the microprocessor on the ST* line, it will return a pulse to the microprocessor on the NMI* line, but only if the system supply voltage is less than that required to trip the NMI* interrupt.

Figure 7:
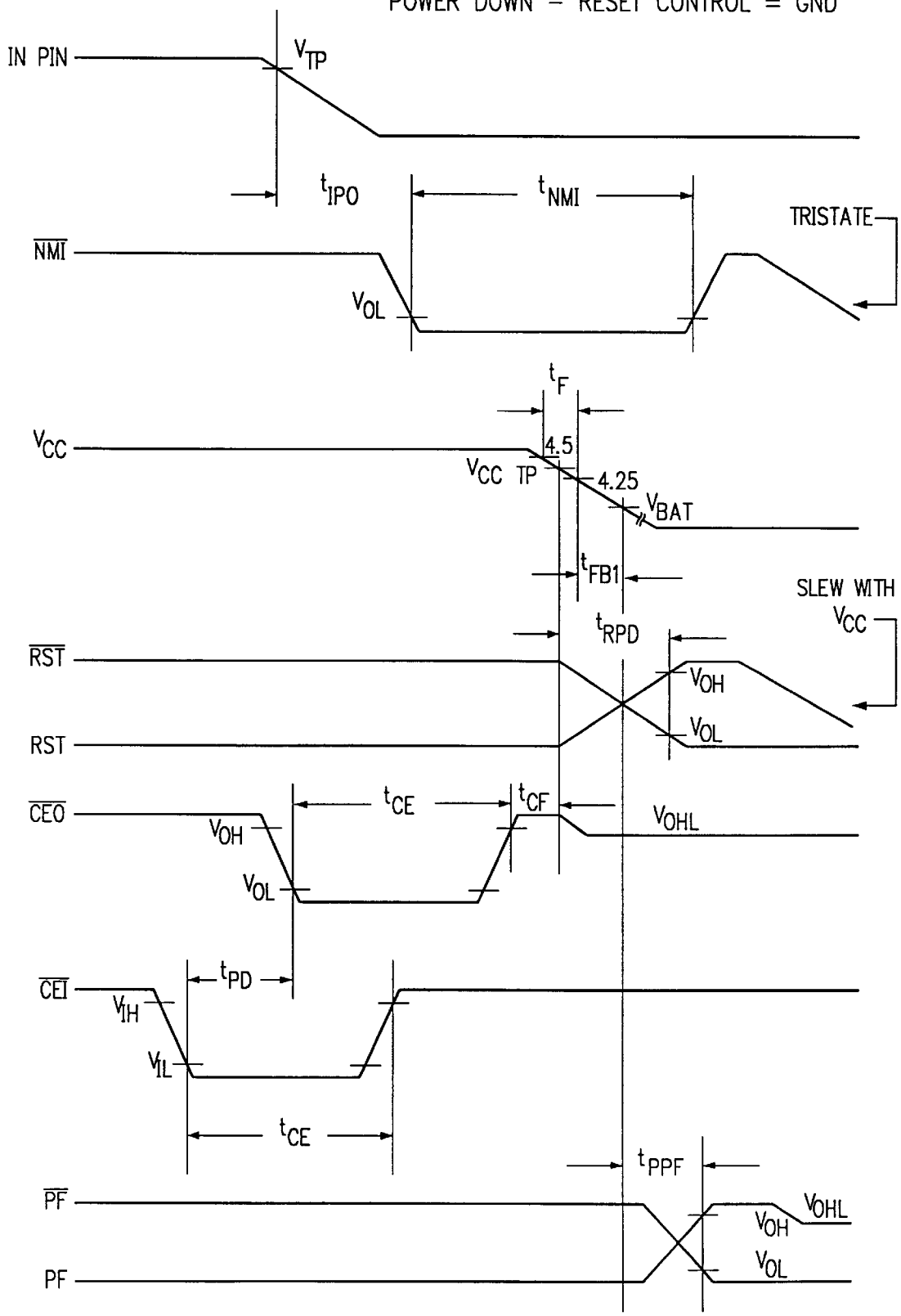
FIG. 7 shows the power-down timing relations which result, in the presently preferred embodiment, when the reset control input (RC) has been tied to ground.
Figure 14:
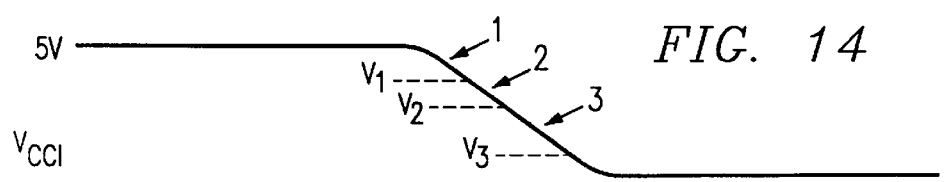
FIG. 14 shows the critical points on the curve of power supply voltage, when the power supply voltage is falling.

FIG. 14 is a simplified version of FIG. 7, which shows this relationship more clearly. In this diagram, $V_1$ refers to the voltage at which the auxiliary chip generates an interrupt (on line NMI*, in the presently preferred embodiment); voltage $V_2$ is the voltage at which the auxiliary chip generates a reset (this is equal to voltage $V_{CCTP}$, in the presently preferred embodiment); and voltage $V_3$ is the voltage at which comparator 130 connects the internal VCC to $V_{BAT}$ rather than to $V_{CCI}$ (which is the externally supplied power voltage, as opposed to the on-chip supply Vcc). Correspondingly, several voltage domains are indicated:

in domain 1, $V_{CCI} > V_1$;
in domain 2, $V_1 > V_{CCI} > V_2$;
in domain 3, $V_2 > V_{CCI} > V_3$.

The microprocessor can send a query to the auxiliary chip by pulsing the strobe pin ST*. When this occurs, the auxiliary chip will reply with a pulse on line NMI* if the supply level is then in zone 2, but not If the power supply level is in zone 1. Thus, the microprocessor can use this exchange to recognize whether it is in zone 2. This is important because the watchdog operation is turned off in zone 2, so that otherwise it might be possible for a stuck condition to occur.

MEMORY BACKUP: The auxiliary chip provides all necessary functions required to battery back up a static RAM. First, a switch is provided to direct power from the incoming 5 volt supply ($V_{CC}$) or from a battery ($V_{BAT}$) whichever is greater. This switched supply ($V_{CCO}$) can also be used to battery back CMOS microprocessors. (The reset control and wake control sections provide further discussion regarding nonvolatile microprocessor applications.) Second, the same power fail detection described in the power monitor section is used to inhibit the chip enable input (CEI*) and hold the chip enable output (CEO*) to within 0.3 volts of $V_{CC}$ or battery supply. This write protection mechanism occurs as $V_{CC}$ falls below $V_{CCTP}$ as specified previously. If CEI* is low at the time power fail detection occurs, CEO* is held in its present state until CEI* is returned high, or if CEI* is held low, CEO* is held active for $t_{CE}$ maximum. This delay of write protection until the current memory cycle is completed prevents the corruption of data. If CEO* is in an inactive state at the time of $V_{CC}$ fail detection, CEO* will be unconditionally disabled within $t_{CF}$. During nominal supply conditions CEO* will follow CEI* with a maximum propagation delay of 20 ns.

Figure 3:
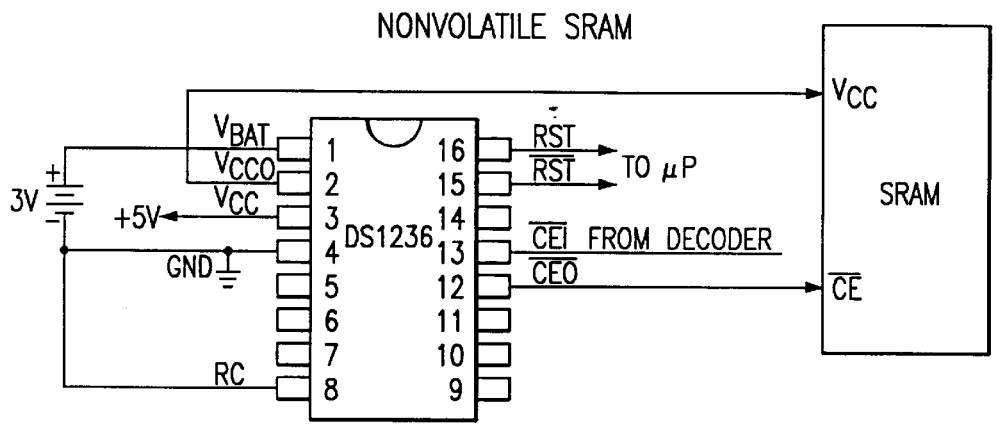
FIG. 3 shows a typical nonvolatile SRAM application.

FIG. 3 shows a typical nonvolatile SRAM application. If nonvolatile operation is not required, the battery input pin $V_{BAT}$ must be grounded. In order to conserve battery capacity during storage and/or shipment of a system, the auxiliary chip provides a freshness seal to electronically disconnect the battery.

Figure 4:
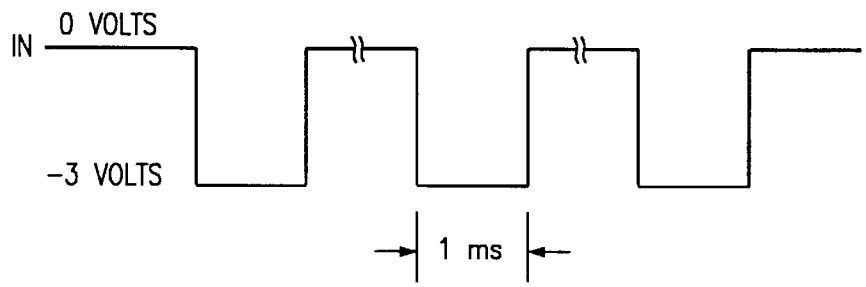
FIG. 4 depicts the three negative pulses on the IN pin which are used to invoke the freshness seal.
Figure 5:
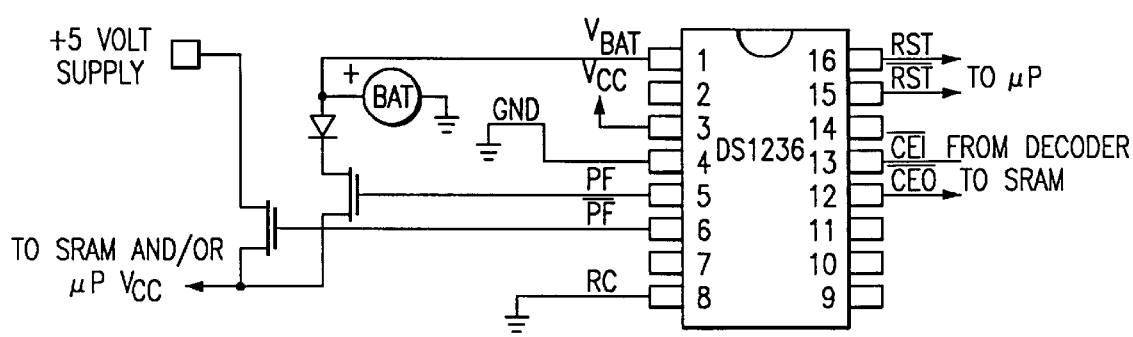
FIG. 5 shows how the external supply voltage is switched by discrete transistors, controlled by power-fail signal PF and its complement PF*.

FIG. 4 depicts the three pulses below ground on the IN pin required to invoke the freshness seal. The freshness seal will be disconnected and normal operation will begin when $V_{CC}$ is next applied to a level above $V_{BAT}$.

POWER SWITCHING: For certain high current battery backup applications, the 5 volt supply and battery supply switches internal to the auxiliary chip may not be large enough to support the given load within significant voltage drop. For these applications, the PF and PF* outputs are provided to gate external switching devices to switch supply from $V_{CC}$ to battery on power down and from battery to $V_{CC}$ on power up. The transition threshold for PF and PF* is set to the external battery voltage $V_{BAT}$ (see FIG. 6). The load applied to the PF pin from the external switch will be supplied by the battery. Therefore, this load should be taken into consideration when sizing the battery.

RESET CONTROL: Two modes of operation on power down and power up are available, depending upon the level of the reset control (RC) input pin. The level of this pin distinguishes timing and level control on RST, RST*, and NMI* outputs for volatile processor operation versus nonvolatile battery backed (or battery operated) processor applications.

With the RC pin tied to ground, operation is as described above. This mode is used where non-volatile processor functionality is not required. The timing relations of this mode are shown in FIG. 7 (when the power goes down) and FIG. 8 (when the power is restored). Notice that upon $V_{CC}$ going out of tolerance (at $V_{CCTP}$) the RST and RST* outputs are driven active (within a delay $t_{RPD}$) and that RST and NMI* follow $V_{CC}$ as the supply decays. Also, on power up, RST follows $V_{CC}$ and RST* is held active; both remain active for a time $t_{RST}$ after $V_{CC}$ becomes valid. NMI* will pulse low for 500 microsec maximum, and then will follow $V_{CC}$.

Figure 8:
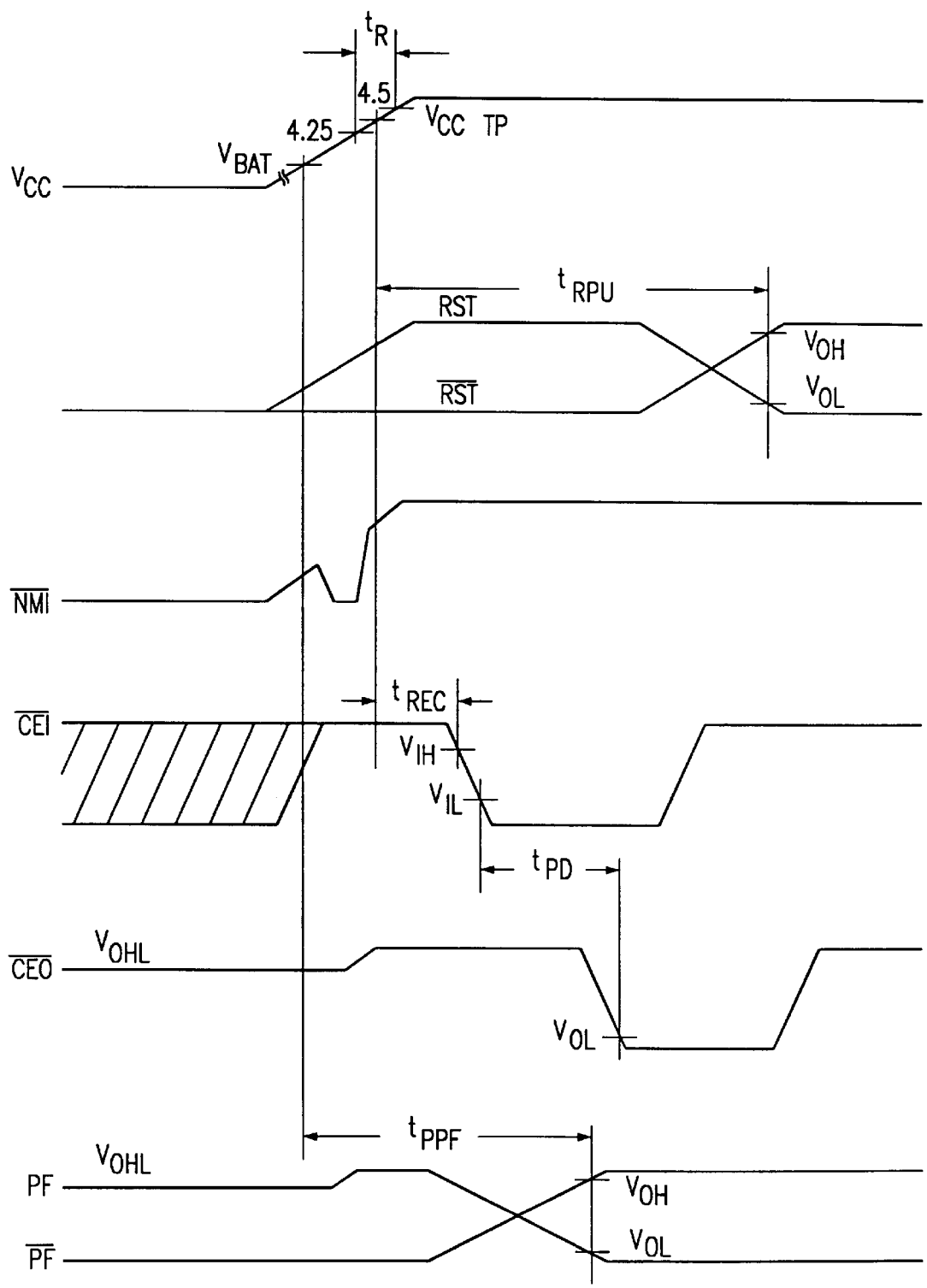
FIG. 8 shows the power-up timing relations which result, in the presently preferred embodiment, when the reset control input (RC) has been tied to ground.
Figure 9:
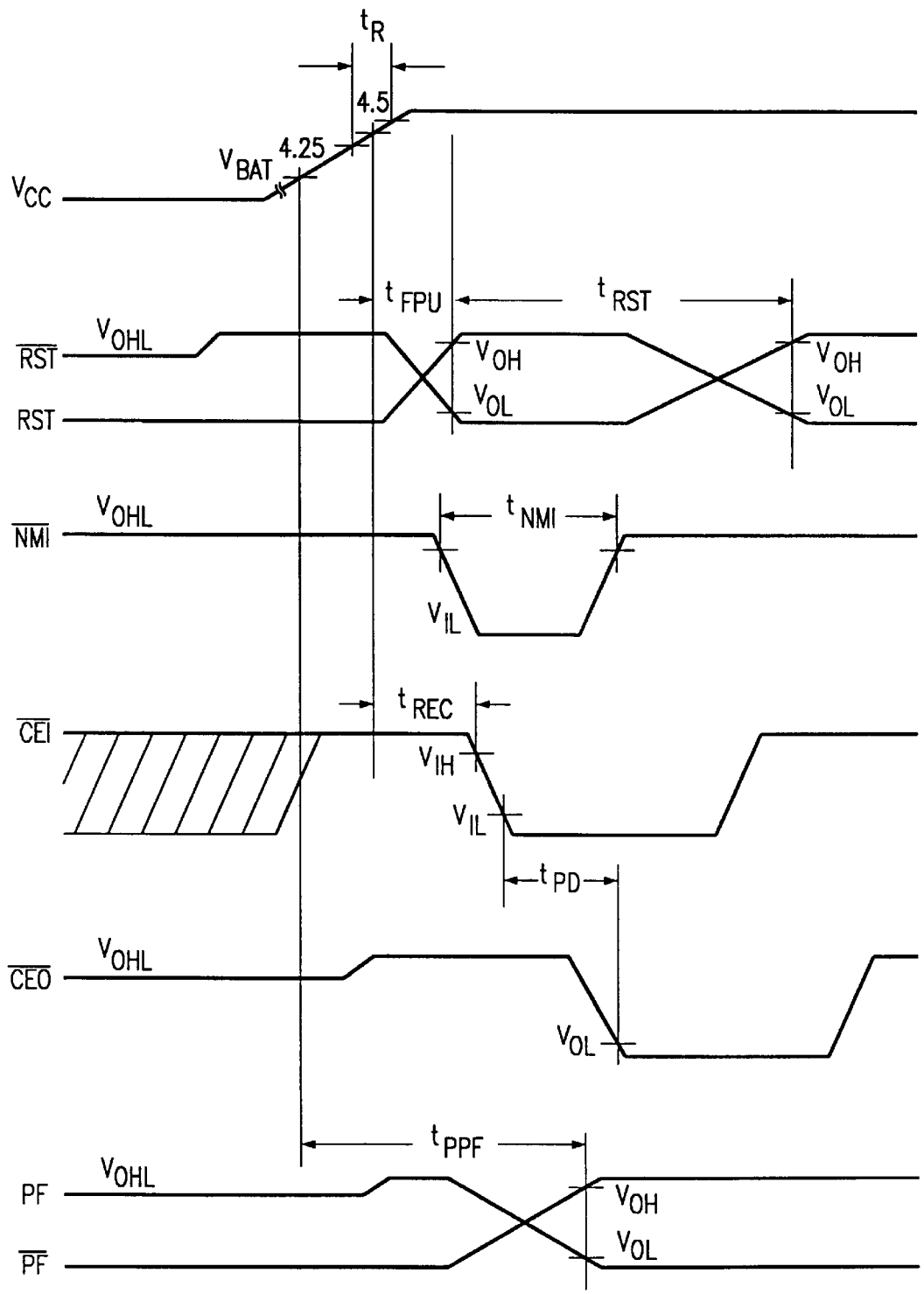
FIG. 9 shows the power-up timing relations which result, in the presently preferred embodiment, when the reset control input (RC) has been tied to $V_{CCO}$.
Figure 12:
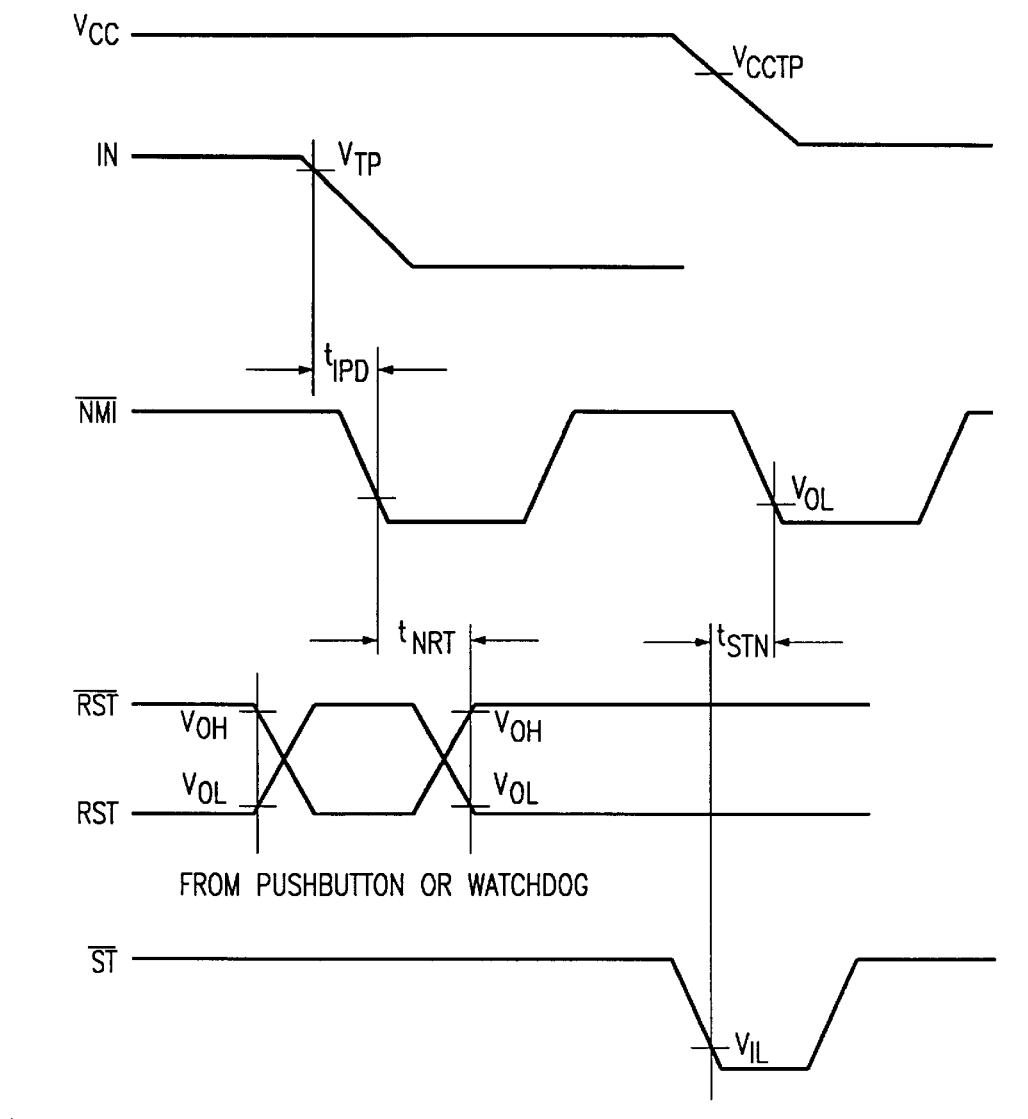
FIG. 12 shows the timing relation between the NMI* and ST* signals.

With the RC pin tied to $V_{CCO}$, operation is as shown in the timing diagrams of FIG. 6 (when the power goes down) and FIG. 8 (when the power is restored). This mode of operation is especially useful for applications in which the processor is made nonvolatile with an external source and allows the processor to power down into a "stop" mode as signaled from NMI* at an earlier voltage level.

As power goes down, RST and RST* are not forced active as $V_{CC}$ collapses to $V_{CCTP}$, and RST* is held at a high level by the battery as $V_{CC}$ falls below battery potential. The NMI* output pin will pulse low for $t_{NMI}$ following a low voltage detect at the pin of $V_{TP}$. However, NMI* will also be held at a high level following $t_{NMI}$ by the battery as $V_{CCCCC}$ decays below $V_{BAT}$.

On power up, RST and RST* are held inactive until $V_{CC}$ reaches power valid $V_{CCTP}$, then RST and RST* are driven active for $t_{RST}$. NMI* will pulse low for 500 microseconds maximum then will follow $V_{CC}$ during the power up sequence.

Thus, once NMI* is driven active, the processor may power down into a "stop" mode and subsequently be restarted by any of several different signals. If $V_{CC}$ does not fall below $V_{CCTP}$, the processor will be restarted by the reset derived from the watchdog timer as the IN input rises above $V_{tp}$. If $V_{CC}$ falls below $V_{CCTP}$ but not below $V_{BAT}$, the processor will be restarted as $V_{CC}$ rises above $V_{CCTP}$. If $V_{CC}$ falls below $V_{BAT}$, the reset outputs will be forced active the next time $V_{CC}$ rises above $V_{CCTP}$ as shown in the power up timing diagram If the IN pin falls below VTP during an active reset, the reset outputs will be forced inactive by the NMI* output. An additional NMI* pulse for "stop" mode control will follow the initial NMI*, by stimulation of the ST* input, at $t_{STN}$. The pushbutton input PBRST* may be used, whenever $V_{CC}$ is above $V_{BAT}$, to drive the reset outputs and thus restart the processor.

WAKE CONTROL/SLEEP CONTROL: The Wake/Sleep Control input WC/SC* allows the processor to disable all comparators on the auxiliary chip, processor, and nonvolatile static RAM to maintain nonvolatility in the lowest power mode possible. The processor may invoke the sleep mode in battery operate applications to conserve capacity when an absence of activity is detected. The auxiliary chip may subsequently be restarted by a high to low transition on the PBRST* input via human interface by a keyboard, touch pad, etc. The processor will then be restarted as the watchdog timer times out and drives RST and RST* active. The auxiliary chip can also be woken up by forcing the WC/SC* pin high from an external source. Also, if the auxiliary chip is placed in sleep mode by the processor, and $V_{CC}$ later falls below $V_{BAT}$, the auxiliary chip will wake up the next time $V_{CC}$ rises above $V_{CCTP}$. That is, the auxiliary chip leaves the sleep mode as the power is falling below $V_{BAT}$. (As noted, when the processor invokes the sleep mode during normal power valid operation, all operation on the auxiliary chip is disabled, thus leaving the NM*, RST and RST* outputs disabled as well as the ST* and IN inputs.) The PBRST* input will also become inactive when the main battery supply falls below the IN input at $V_{TP}$ or the backup 3 volt supply at $V_{BAT}$. Subsequent power up with a new main battery supply will activate the RST and RST* outputs as the main supply rises above $V_{CCTP}$. Please review the timing diagram for wake/sleep control. A high to low transition on the WC/SC* pin must follow a high to low transition on the ST* pin by $t_{WC}$ to invoke a "sleep" mode for the auxiliary chip.

Figure 13:
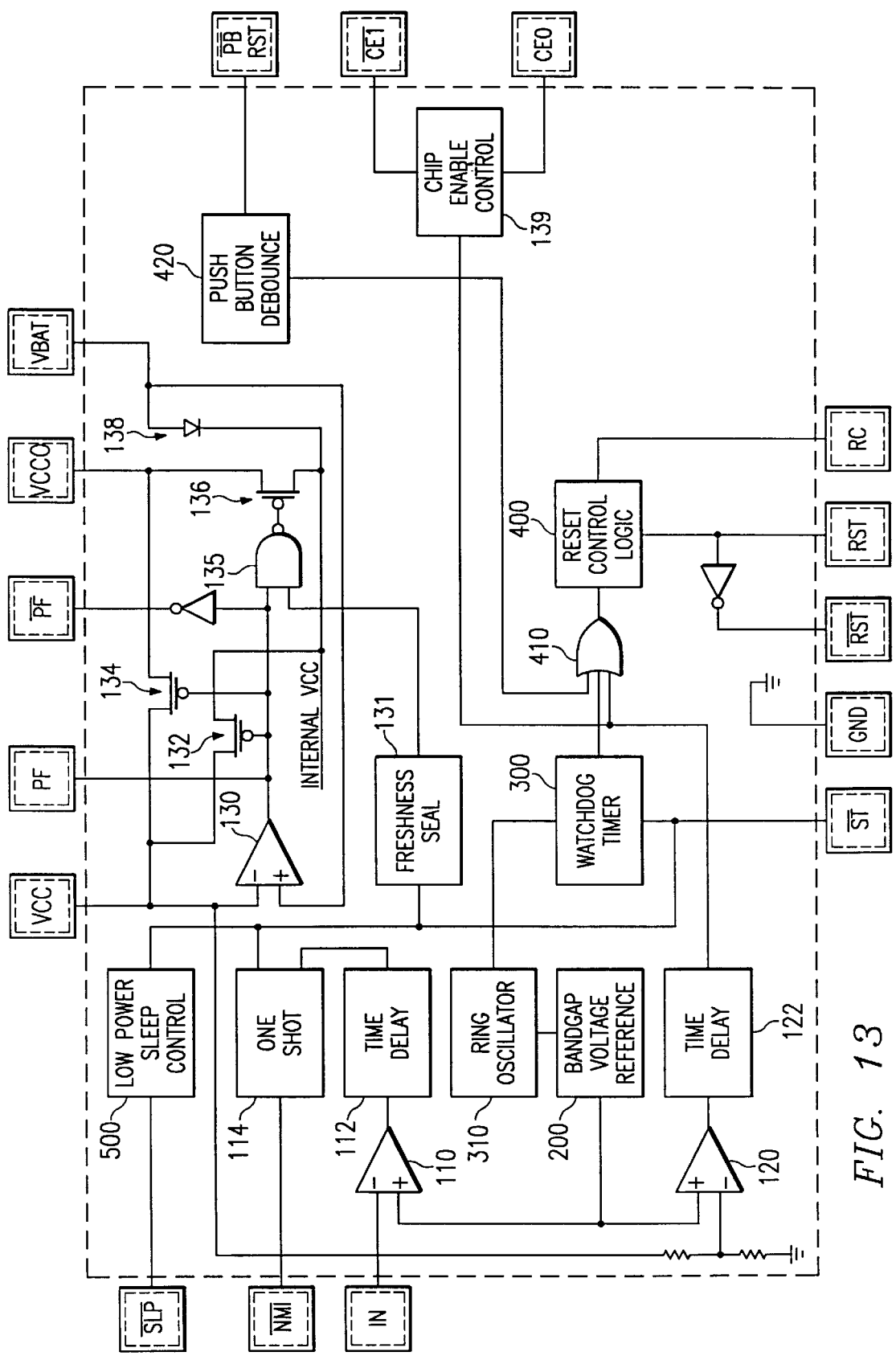
FIG. 13 shows the overall organization of the auxiliary chip of the presently preferred embodiment.

FIG. 13 shows the overall electrical organization of the auxiliary chip of the presently preferred embodiment. A first comparator 110 compares the input voltage at the IN pin with the reference voltage provided by bandgap voltage reference generator 200. The output of this comparator is connected through time delay stage 112 to one-shot 114. Thus one-shot 114 will provide a pulse on the NMI* output pin when comparator 110 sees that the voltage at pin IN has fallen below limits. (As noted, a resistive divider network would commonly be used to scale the supply voltage appropriately for this comparison.)

A second comparator 120 compares a fraction of the supply voltage input $V_{CCI}$ (scaled by resistors 121) with the reference voltage provided by bandgap voltage reference generator 200. The output of this comparator 120 is connected, through time delay stage 122 and OR gate 410, to reset control logic 400.

Note that the output of comparator 120 is also connected (through the time delay block 122) to control a chip-enable-control gate 139, so that incoming chip-enable signals CEI* will not be passed through to signal CEO* when $V_{CCI}$ has fallen below $V_{CCTP}$.

A third comparator 130 compares the external VCC supply voltage input ($V_{CCI}$) against the battery voltage $V_{BAT}$, and switches large transistors 132, 134, and 136 (via NAND gate 135) appropriately, to connect the external power supply output VCCO and the internal power supply lines VCC to $V_{BAT}$ if $V_{CCI}$ falls significantly below $V_{BAT}$.

The NAND gate 135 also receives an input from freshness seal logic 131, so that, if the input from freshness seal logic 131 is low, transistor 136 will never turn on. In this case, if the external power supply $V_{CCI}$ fails, comparator 130 will drive its output PF positive, turning off transistors 132 and 134, and pin $V_{CCO}$ will be floated. This avoids any loss of battery lifetime due to drain from external devices. The freshness seal logic 131 decodes signals received on the SLP* pin, as described above, to enter or leave the freshness-seal mode.

The output of the bandgap voltage reference 200 is also used by a current source (not separately shown), which provides a temperature-independent current to the ring oscillator. This current source also provides a temperature-independent current to the voltage reference 200. The voltage reference 200 uses this current to define charging relationships, and also makes use of the output of the ring-oscillator (to chipper-stabilize the comparators). The ring oscillator 310 provides a constant-frequency output to watchdog timer 300. The watchdog timer 300 provides timing and alarm functions, such as those performed by commercially available part DS1286. (This integrated circuit and its data sheet are available from Dallas Semiconductor Corporation, 4350 Beltwood Parkway, Dallas Tex. 75244, and are both hereby incorporated by reference.) In particular, the watchdog timer will provide an input to OR gate 410, to generate a reset, if it counts down through its time-out limit without having received a pulse on pin ST*.

The sleep-control logic 500 receives inputs from the SLP* pin and also from the ST* pin. The outputs of this logic (not shown) can disable not only watchdog timer 300, but also are connected to disable bandgap voltage reference 200, oscillator 310, and comparators 110 and 120. Comparator 130 is not disabled, but is switched into a low-power mode. In comparator 130's low-power mode, its bias current is reduced, so that it can still detect when $V_{CCI}$ falls below $V_{BAT}$, it reacts more slowly.

The third input to the OR gate 410 is from the pushbutton input PBRST*, which is cleaned up by debounce logic 420. Thus, the user can manually initiate a reset of the microprocessor at any time, without power-cycling the whole system, simply by hitting a pushbutton connected to this logic input.

Thus, the reset control logic 400 can be conditionally commanded to initiate a reset by any of the three inputs just described. However, the reset control logic 400 also receives external control input RC, and also is connected to see the outputs of comparators 110 and 120, to implement the logical relations described above.

The following tables give specific values for some of the voltage and timing parameters just referred to, as used in the specific context of the presently preferred embodiment. It must be understood that these specific values are given merely to provide a wealth of detail regarding the preferred embodiment, and for better understanding of FIGS. 6-9, and do not by any means delimit necessary features of the invention.

| ABSOLUTE MAXIMUM RATINGS | |
|---|---|
| VOLTAGE ON ANY PIN RELATIVE TO GROUND | - 1.0 V to +7.0 V |
| OPERATING TEMPERATURE | - 0 to 70 C. |
| STORAGE TEMPERATURE | - −55 to +125° C. |
| SOLDERING TEMPERATURE | - 260 for 10 seconds |

A. C. ELECTRICAL CHARACTERISTICS
(0 C. to 70 C., $V_{CC}$ = 4.5V to 5.5V)

| PARAMETER | SYMBOL | MIN. | TYP. | MAX. | UNITS | NOTES |
|---|---|---|---|---|---|---|
| $V_{CC}$ Fail Detect to RST, RST* | $t_{RPD}$ | | 50 | 100 | us | |
| $V_{TP}$ to NMI* | $t_{IPD}$ | 30 | 50 | 100 | us | |
| RESET Active Time | $t_{RST}$ | 40 | 60 | 80 | ms | |
| NMI* Pulse Width | $t_{NMI}$ | 200 | 300 | 500 | us | |
| ST* Pulse Width | $t_{ST}$ | 20 | | | ns | |
| PB RST* @ $V_{IL}$ | $t_{PB}$ | 30 | | | ms | |
| $V_{CC}$ Slew Rate 4.75V to 4.25 V | $t_F$ | 300 | | | us | |
| Chip Enable Propagation Delay | $t_{PD}$ | | | 20 | ns | |
| Chip Enable High to $V_{CC}$ Fail | $t_{CF}$ | | | 20 | ns | |
| $V_{CC}$ Valid to (RST & RST* RC = 1) | $t_{FPU}$ | | | 100 | ns | |
| $V_{CC}$ Valid to RST & RST* | $t_{RPU}$ | 40 | 60 | 80 | ms | 5 |
| $V_{CC}$ Slew 4.25V to $V_{BAT}$ | $t_{FB1}$ | 10 | | | us | 7 |
| $V_{CC}$ Slew 4.25 to $V_{BAT}$ | $t_{FB2}$ | 100 | | | us | 8 |
| Chip Enable Output Recovery | $t_{REC}$ | 80 | | | ms | 9 |
| $V_{CC}$ Slew 4.25V to 4.75V | $t_R$ | 0 | | | us | |
| Chip Enable Pulse Width | $t_{CE}$ | | | 5 | us | 10 |
| Watch Dog Time Delay | $t_{TD}$ | 150 | 220 | 300 | ms | |
| ST* to WC/SC* | $t_{WC}$ | 0.1 | | 50 | us | |
| $V_{BAT}$ Detect to PF, PF* | $t_{PPF}$ | | | 2 | us | 7 |
| ST* to NMI* | $t_{STN}$ | | | 30 | ns | 11 |
| NMI* to RST & RST* | $t_{NRT}$ | | | 30 | ns | |

RECOMMENDED D. C. OPERATING CONDITIONS
(0 C. to 70 C.)

-continued

| PARAMETER | SYM-BOL | MIN. | TYP. | MAX. | U-NITS | NOTES |
|---|---|---|---|---|---|---|
| Supply Voltage | $V_{CC}$ | 4.5 | 5.0 | 5.5 | V | 1 |
| Supply Voltage (5% option) | $V_{CC}$ | 4.75 | 5.0 | 5.5 | V | 1 |
| Input High Level | $V_{IH}$ | 2.0 | | $V_{CC}$+0.3 | V | 1 |
| Input Low Level | $V_{IL}$ | −0.3 | | +0.8 | V | 1 |
| IN Input Pin | $V_{IN}$ | | | $V_{CC}$ | V | 1 |
| Battery Input | $V_{BAT}$ | 2.7 | | 4.0 | V | 1 |

D. C. ELECTRICAL CHARACTERISTICS
(0 C. to 70, $V_{cc}$ = 4.5V to 5.5V)

| PARAMETER | SYM-BOL | MIN. | TYP. | MAX. | U-NITS | NOTES |
|---|---|---|---|---|---|---|
| Supply Current | $I_{CC}$ | | | 5 | mA | 2 |
| Supply Current Output | $I_{CCO1}$ | | | 100 | mA | 3 |
| Supply Voltage Output | $V_{CCO}$ | $V_{CC}$−0.3 | | | V | 1 |
| Input Leakage | $I_{LI}$ | −1.0 | | +1.0 | uA | |
| Output Leakage | $I_{LO}$ | −1.0 | | +1.0 | uA | |
| Output Current @ 0.4V | $I_{OL}$ | | | 4.0 | mA | 12 |
| Output Current @ 2.4V | $I_{OH}$ | −1.0 | | | mA | 13 |
| Power Supply Trip Point | $V_{CCTP}$ | 4.25 | 4.37 | 4.50 | V | 1 |
| Power Supply Trip Point (5% option) | $V_{CCTP}$ | 4.50 | 4.62 | 4.75 | V | 1 |
| IN Input Pin Current | $I_{CCIN}$ | | | 0.1 | uA | |
| IN Input Trip Point | $V_{TP}$ | 2.5 | 2.54 | 2.6 | V | 1 |
| Battery Backup Current | $I_{CCO2}$ | | | 1.0 | mA | 4 |
| Battery Backup Current | $I_{CCO}$ | $V_{BAT}$−0.7 | | | V | 1, 6 |
| Battery Current CE* and PF | $I_{BAT}$ | | | 0.1 | uA | 2 |
| Output Voltage | $V_{OHL}$ | $V_{BAT}$−0.7 | | | V | 1, 6 |

CAPACITANCE
($t_A$ = 25)

| PARAMETER | SYM-BOL | MIN. | TYP. | MAX. | U-NITS | NOTES |
|---|---|---|---|---|---|---|
| Input Capitance | $C_{IN}$ | | | 5 | pF | |
| Output Capitance | $C_{OUT}$ | | | 7 | pF | |

NOTES:
1. All voltages referenced to ground
2. Measured with $V_{CCO}$ pin, CEO* pin, PF pin, and NMI* pin open
3. $I_{CCO1}$ is the maximum average load which the DS1236 can supply at $V_{CC}$−3V through the $V_{CCO}$ pin during normal 5 volt operation
4. $I_{CCO2}$ is the maximum average load which the DS1236 can supply through the $V_{CCO}$ pin during data retention battery supply operation.
5. With $t_R$ = 5 us
6. $V_{CCO}$ is approximately $V_{BAT}$−0.5V at 1 ua load.
7. Sleep mode is not invoked
8. Sleep mode is invoked.
9. $t_{REC}$ is the minimum time required before memory access to allow for deactivation of RST and RST*.
10. $t_{CE}$ maximum must be met top insure data integrity on power loss.
11. In input is less than VTp but Vcc greater than $V_{CCTP}$.
12. All outputs except RST* which is 50 ua min.

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

For example, the microprocessor's programming can use the power-down warning interrupt to trigger a state-save operation.

For another example, the disclosed auxiliary chip can be used with a wide variety of microprocessors, microcontrollers, or microcomputers, including ones which do and ones which do not have their own battery back-up supplies; 8-bit, 16-bit, 32-bit, or other architectures; general-purpose processors, DSPs (digital signal processors), or ASICs (application-specific integrated circuits); numeric or symbolic processors; and others.

For another example: a wide range of system contexts are enabled by the disclosed inventions, including (for example) portable computers, device controllers, desktop computers, sub-processors which perform management functions in minicomputer, mainframe, or even supercomputer systems.

As will be recognized by those skilled in the art, the innovative concepts described in the present application can be modified and varied over a tremendous range of applications, and accordingly their scope is not limited except by the allowed claims.

What is claimed is:

1. An integrated circuit for providing supervisory functions to a microprocessor, said integrated circuit comprising:
   a first means for comparing a supply voltage with a first reference voltage, said first means providing an interrupt signal to a microprocessor if said supply voltage drops below said first reference voltage;
   a second means for comparing said supply voltage with a second reference voltage, said second means allowing a chip enable signal to be communicated to said microprocessor if said supply voltage is above said second reference voltage;
   a third means for comparing said supply voltage with a backup voltage and for coupling said backup voltage to an output of said integrated circuit if said supply voltage is below a predetermined voltage;
   a resetting circuit for generating a reset signal for said microprocessor if a strobe signal not received by said reset within a predetermined amount of time;
   a sleep control circuit for disabling at least one of said first means, said second means, said third means and said resetting means when a sleep signal is received by said sleep control circuit; and
   a debounce circuit for receiving a user generated reset signal and for providing a debounced signal for resetting said microprocessor.

2. The integrated circuit of claim 1, further comprising a band gap voltage reference generator which provides a voltage reference for at least on of said first means and said second means.

3. The integrated circuit of claim 1, wherein said resetting circuit comprises a ring oscillator connected to watchdog timer, said watchdog timer generates said reset signal.

4. An integrated circuit for providing supervisory functions for a microprocessor, said integrated circuit comprising:
   a resetting circuit for providing a resetting signal to a microprocessor, said resetting circuit comprising:

first circuitry for determining if a supply voltage drops below a first predetermined voltage level, if said supply voltage drops below said first predetermined voltage then said resetting circuitry may provide said resetting signal to said microprocessor, second circuitry for determining whether said microprocessor is operating normally, if said second circuitry determines that said microprocessor is not operating normally then said resetting circuitry may provide said resetting signal to said microprocessor, and sleep control circuitry for disabling said first and second circuitry in response to a provided sleep signal.

5. The integrated circuit of claim 4, wherein said resetting circuitry further comprises debouncing circuitry for receiving a user generated reset signal and for debouncing said user generated reset signal, said resetting circuitry provides said resetting signal to said microprocessor when said user generated reset signal is received.

6. The integrated circuit of claim 4, wherein said second circuitry comprises a watchdog timer that resets when said watchdog timer receives a data signal from said microprocessor.

7. The integrated circuit of claim 4, further comprising a power switching circuit for switching power to said microprocessor from said supply voltage to a backup power source when said supply voltage drops below a second predetermined voltage.

8. The integrated circuit of claim 4, further comprising a power switching circuit for switching power to a memory circuit from said supply voltage to a backup power source when said supply voltage drops below a second predetermined voltage.

9. The integrated circuit of claim 4, further comprising a power failure warning circuit for providing an interrupt signal to a microprocessor when said supply voltage is below a predetermined voltage.

* * * * *

UNITED STATES PATENT AND TRADEMARK OFFICE
CERTIFICATE OF CORRECTION

PATENT NO.   : 5,903,767
DATED        : May 11, 1999
INVENTOR(S)  : Little

It is certified that error appears in the above-identified patent and that said Letters Patent is hereby corrected as shown below:

| | |
|---|---|
| Column 2, line 47 | Replace "ailing" With --failing-- |
| Column 6, line 2 | Replace "NM*" With --NMI*-- |
| Column 6, line 16 | Replace "(V.)" With --$(V_{MAX})$-- |
| Column 6, line 36 | Replace "NM." With --NMI.-- |
| Column 6, line 42 | Replace "NM*" With --NMI*-- |
| Column 7, line 1 | Replace "If" With --if-- |
| Column 8, line 14 | Replace "$V_{ccccc}$" With --$V_{cc}$-- |
| Column 8, line 55 | Replace "NM*" With --NMI*-- |

UNITED STATES PATENT AND TRADEMARK OFFICE
CERTIFICATE OF CORRECTION

PATENT NO. : 5,903,767
DATED : May 11, 1999
INVENTOR(S) : Little

It is certified that error appears in the above-identified patent and that said Letters Patent is hereby corrected as shown below:

Column 11, line 37   Replace "$I_{CCO}$" With --$V_{CCO}$--

Column 11, line 38   Replace "Current" With --Voltage--

Column 11, line 62   Replace "$VT_P$" With --$V_{TP}$--

Signed and Sealed this

Twenty-second Day of February, 2000

Q. TODD DICKINSON

Attest:

Attesting Officer

Commissioner of Patents and Trademarks